United States Patent
May

(10) Patent No.: US 10,544,831 B2
(45) Date of Patent: Jan. 28, 2020

(54) ROLLER BEARING ARRANGEMENT AND X-RAY TUBE BEARING

(71) Applicant: GEBRÜDER REINFURT GMBH & CO. KG, Rimpar (DE)

(72) Inventor: Wolfgang May, Kitzingen (DE)

(73) Assignee: GEBRÜDER REINFURT GMBH & CO. KG, Rimpar (DE)

( * ) Notice: Subject to any disclaimer, the term of this patent is extended or adjusted under 35 U.S.C. 154(b) by 0 days.

(21) Appl. No.: 16/318,698

(22) PCT Filed: Jul. 18, 2017

(86) PCT No.: PCT/EP2017/000870
§ 371 (c)(1),
(2) Date: Jan. 17, 2019

(87) PCT Pub. No.: WO2018/015011
PCT Pub. Date: Jan. 25, 2018

(65) Prior Publication Data
US 2019/0242432 A1 Aug. 8, 2019

(30) Foreign Application Priority Data

Jul. 19, 2016 (DE) .......................... 10 2016 008 824

(51) Int. Cl.
*F16C 19/54* (2006.01)
*F16C 35/063* (2006.01)
(Continued)

(52) U.S. Cl.
CPC .......... *F16C 19/548* (2013.01); *F16C 25/083* (2013.01); *F16C 35/063* (2013.01);
(Continued)

(58) Field of Classification Search
CPC ........................... F16C 25/083; F16C 2380/16
See application file for complete search history.

(56) References Cited

U.S. PATENT DOCUMENTS 5,308,172 A * 5/1994 Upadhya ................. F16C 27/08
378/132
6,307,292 B1 * 10/2001 Brown .................... F16C 25/08
310/90

(Continued)

FOREIGN PATENT DOCUMENTS

DE 860651 B 12/1952
DE 948697 B 9/1956
(Continued)

OTHER PUBLICATIONS

International Search Report and Written Opinion dated Nov. 9, 2017 by the International Searching Authority (European Patent Office) in PCT Application PCT/EP2017/000870.
(Continued)

*Primary Examiner* — Thomas R Hannon
(74) *Attorney, Agent, or Firm* — NovoTechIP International PLLC

(57) ABSTRACT

The invention relates to a rolling bearing arrangement with: a housing (10), a shaft (20), a first rolling bearing and a second rolling bearing for rotatably supporting the shaft in the housing, wherein the first rolling bearing is designed as a fixed bearing in which an outer ring (32) of the first rolling bearing is positionally fixed in the housing and an inner ring (34) of the first rolling bearing is rigidly connected to the shaft, wherein the second rolling bearing is designed as a floating bearing in which the outer ring (42) of the second rolling bearing is arranged axially displaceably in the housing and the inner ring (44) of the second rolling bearing is connected axially displaceably to the shaft, and wherein both the outer ring (42) and the inner ring (44) of the second rolling bearing are each pressed in the axial direction towards the first rolling bearing by a pre-tensioning means in order to prevent a rotation of the outer ring (42) relative
(Continued)

to the housing and a rotation of the inner ring (44) relative to the shaft.

14 Claims, 2 Drawing Sheets

(51) Int. Cl.
    *F16C 35/067*     (2006.01)
    *F16C 25/08*     (2006.01)
    *H01J 35/10*     (2006.01)

(52) U.S. Cl.
    CPC ........ *F16C 35/067* (2013.01); *H01J 35/1024* (2019.05); *F16C 2380/16* (2013.01)

(56) References Cited

U.S. PATENT DOCUMENTS

| | | | | |
|---|---|---|---|---|
| 6,430,262 B1* | 8/2002 | Panasik | ................ | F16C 25/083 378/121 |
| 7,377,695 B2* | 5/2008 | Qiu | ................ | F16C 19/54 378/132 |
| 2005/0031241 A1* | 2/2005 | Obara | ................ | F16C 19/08 384/517 |

FOREIGN PATENT DOCUMENTS

| | | |
|---|---|---|
| DE | 20 32 111 A1 | 1/1971 |
| DE | 7800563 U1 | 6/1978 |
| DE | 41 35 565 A1 | 5/1993 |
| DE | 19624919 A1 | 8/1997 |
| DE | 198 04 328 A1 | 8/1999 |
| DE | 602 03 651 T2 | 3/2006 |
| DE | 112011104354 T5 | 9/2013 |

OTHER PUBLICATIONS

Office Action dated Jul. 4, 2017 by the German Patent and Trademark Office in DE Application 10 2016 008 824.9 (English translation).

* cited by examiner

ROLLER BEARING ARRANGEMENT AND X-RAY TUBE BEARING

TECHNICAL FIELD

The present invention relates to a rolling bearing assembly and an X-ray tube bearing with such a rolling bearing assembly.

BACKGROUND

In some applications, such as medical devices or sensitive electronic devices, such as x-ray tubes, it is not possible to use a lubricant on a rolling bearing assembly in order to avoid contamination. Accordingly, the rolling bearings used become very hot and wear out in a short time. It would therefore be desirable to have a lubricant-free rolling bearing assembly with an increased service life.

DE 198 04 328 A1 discloses an axial fixing of a rolling bearing receiving a shaft for use in a three-phase generator for motor vehicles. Here, the rotor of the electric machine is mounted axially free of clearance by a corrugated spring, as an elastic element, pressing against the outer ring of the rolling bearing to eliminate the axial clearance. The inner ring is axially fixed to the shaft and a resilient washer abuts against the inner ring, on which a spring washer provided with radially outwardly facing claws rests. Accordingly, the outer ring of the rolling bearing is axially displaceable and is displaced by the spring washer such that the axial clearance disappears, while the inner ring of the rolling bearing is fixedly arranged on the shaft.

Hence, there is a need to provide a roller bearing assembly that does not require lubricants and at the same time has a long service life.

SUMMARY

The above-described need is solved by the features of the independent claims. Advantageous embodiments of the invention are defined in the dependent claims.

According to a first aspect, a rolling bearing assembly with the following components is provided: a housing, a shaft rotatable relative to the housing, and a first rolling bearing and a second rolling bearing for rotatably supporting the shaft in the housing, wherein the first rolling bearing is designed as a fixed bearing by an outer ring of the first rolling bearing being stationarily arranged in the housing and an inner ring of the first rolling bearing being fixedly connected to the shaft, so that the inner and outer rings do neither twist nor are axially displaceable, wherein the second rolling bearing is designed as a floating bearing by the outer ring of the second rolling bearing being arranged axially displaceable in the housing and the inner ring of the second rolling bearing being axially displaceably connected to the shaft, and wherein both the outer ring and the inner ring of the second rolling bearing are each pushed toward the first rolling bearing by a respective biasing means in the axial direction to prevent rotational movement of the outer ring with respect to the housing and rotational movement of the inner ring with respect to the shaft due to the friction generated by the bias.

By the second rolling bearing being designed as a floating bearing, in which both the outer ring and the inner ring are axially displaceable, thermal expansions due to the high temperatures occurring due to the absence of the lubricant can be absorbed such that no high surface pressures between the rolling elements of the rolling bearings and the bearing shells arranged in the inner and outer rings occur.

Here, both the inner ring and the outer ring is biased in the axial direction by the biasing means, so that in spite of the clearance fit the outer and inner rings of the floating bearing are fixed against rotation in their bearing seats in the housing or on the shaft and cannot rotate relative to the shaft or housing. On the other hand, an axial movement of the inner ring and the outer ring of the floating bearing is possible due to their clearance fit. In other words, a displacement of the floating bearing, i.e. of the inner ring and the outer ring of the floating bearing, in the axial direction for receiving thermal expansions is possible, while relative rotation of the inner ring with respect to the shaft or relative rotation of the outer ring with respect to the housing is prevented by the biasing means.

In this way, no high surface pressures, i.e. no excessively high surface pressures between the rolling elements of the rolling bearings and the bearing shells thereof occur. Thus, a long service life of the bearing assembly is guaranteed even without the otherwise required lubrication.

Preloaded bearings, such as angular contact ball bearings or taper roller bearings are preferably used as a rolling bearing. In this way, both radial and axial forces can be absorbed. The principle of a preloaded bearing is applied either in the O-arrangement or in the X-arrangement.

Preferably, the O-arrangement is applied as it results in a lower tilting clearance. Decisive for the bearing distance is the distance of the pressure centers. In the case of the O-arrangement, the outer ring lacks one shoulder each, namely on the side opposite the other bearing. In contrast, in the case of the X-arrangement, the outer ring lacks the shoulder on the side facing the respective other bearing. O-arrangements and X-arrangements of preloaded bearings are well known to the skilled person, so that further discussion is unnecessary.

Preferably, a sleeve in abutment with the two outer rings regulates the axial distance between the first and second rolling bearings. In this way, a cylindrical receptacle in the housing can have the same diameter over the entire length thereof, because the floating bearing can be supported on the outer ring of the fixed bearing via the sleeve. In other words, the outer ring of the floating bearing is supported on the outer ring of the fixed bearing via the sleeve and is biased from the side opposite the sleeve via the biasing means in the direction toward sleeve or in the direction toward the fixed bearing.

When thermal expansion occurs, the outer ring of the floating bearing can thus move axially back and forth within the cylindrical receptacle of the housing.

More preferably, by the biasing means, the sleeve pushes the outer ring of the first rolling bearing against a first locking ring arranged in the housing such that the outer ring of the first rolling bearing is fixed against rotation in the housing. Thus, it is possible to dispense with a press fit of the outer ring in the housing, which is otherwise customary in the case of fixed bearings, so that the rolling bearing assembly can be mounted more easily by simply inserting the shaft, with the rolling bearings arranged thereon, into the housing and positioning it with the first locking ring in the axial direction.

Preferably, the biasing means are formed as a first coil spring for axially loading or pushing the outer ring of the floating bearing and as a second coil spring for axially loading or pushing the inner ring of the floating bearing. Here, the first coil spring is preferably arranged coaxially to the second coil spring such that the second, smaller-diameter coil spring is disposed within the first coil spring. However, the invention is not limited to the use of coil springs for forming the biasing means, but any other known biasing means may be used, such as a plate spring, an elastic rubber block or the like.

More preferably, the first coil spring for biasing the outer ring has a higher spring constant than the second coil spring for biasing the inner ring of the floating bearing. In this way, the outer ring is fixed against rotation in a secure manner in the cylindrical receptacle of the housing, while on the other hand the inner ring is fixed against rotation on the shaft, without applying an excessive pressure load on the rolling elements of the rolling bearing and the bearing shells of the inner and outer rings.

Preferably, the outer ring of the first rolling bearing is fixed against rotation via a clamping between the first locking ring and the sleeve and/or via a press fit in the housing, whereas the inner ring of the first rolling bearing forming the first fixed bearing is fixed against rotation on the shaft via a press fit. In other words, an outer diameter of the outer ring of the fixed bearing is slightly smaller or larger than an inner diameter of the cylindrical receptacle of the housing. Furthermore, an outer diameter of the shaft is slightly larger than an inner diameter of the inner ring of the fixed bearing. Furthermore, there is a slight clearance between the outer ring of the floating bearing and the cylindrical receptacle of the housing, and there is also a slight clearance between the shaft and the inner ring of the floating bearing or the floating bearing has a sliding or clearance fit both with respect to its inner ring and with respect to its outer ring.

According to another aspect, a rolling bearing assembly with the following components is provided: a housing, a shaft, a first rolling bearing and a second rolling bearing for rotatably supporting the shaft in the housing, wherein the first rolling bearing is designed as a fixed bearing by an outer ring of the first rolling bearing being stationarily arranged in the housing and an inner ring of the first rolling bearing being fixedly connected to the shaft, wherein the second rolling bearing is designed as a floating bearing by the outer ring of the second rolling bearing being arranged axially displaceable in the housing and the inner ring of the second rolling bearing being axially displaceably connected to the shaft, wherein the outer ring is connected to the housing in a manner fixed against rotation, and the inner ring is connected to the shaft in a manner fixed against rotation and is biased toward the first rolling bearing.

Here, the outer ring of the second rolling bearing may be arranged in the housing in a manner fixed against rotation, but axially displaceable, via a feather key according to DIN 6885 or a wedge or splines.

More preferably, the rolling bearing assembly is used in particular for an X-ray tube bearing, in which the rolling bearings are not lubricated with oil or grease. In addition, the X-ray tube bearing is preferably operated in vacuum.

BRIEF DESCRIPTION OF THE DRAWINGS

The invention will now be explained in more detail by means of an embodiment with reference to the accompanying drawings.

DETAILED DESCRIPTION

Figure 1:
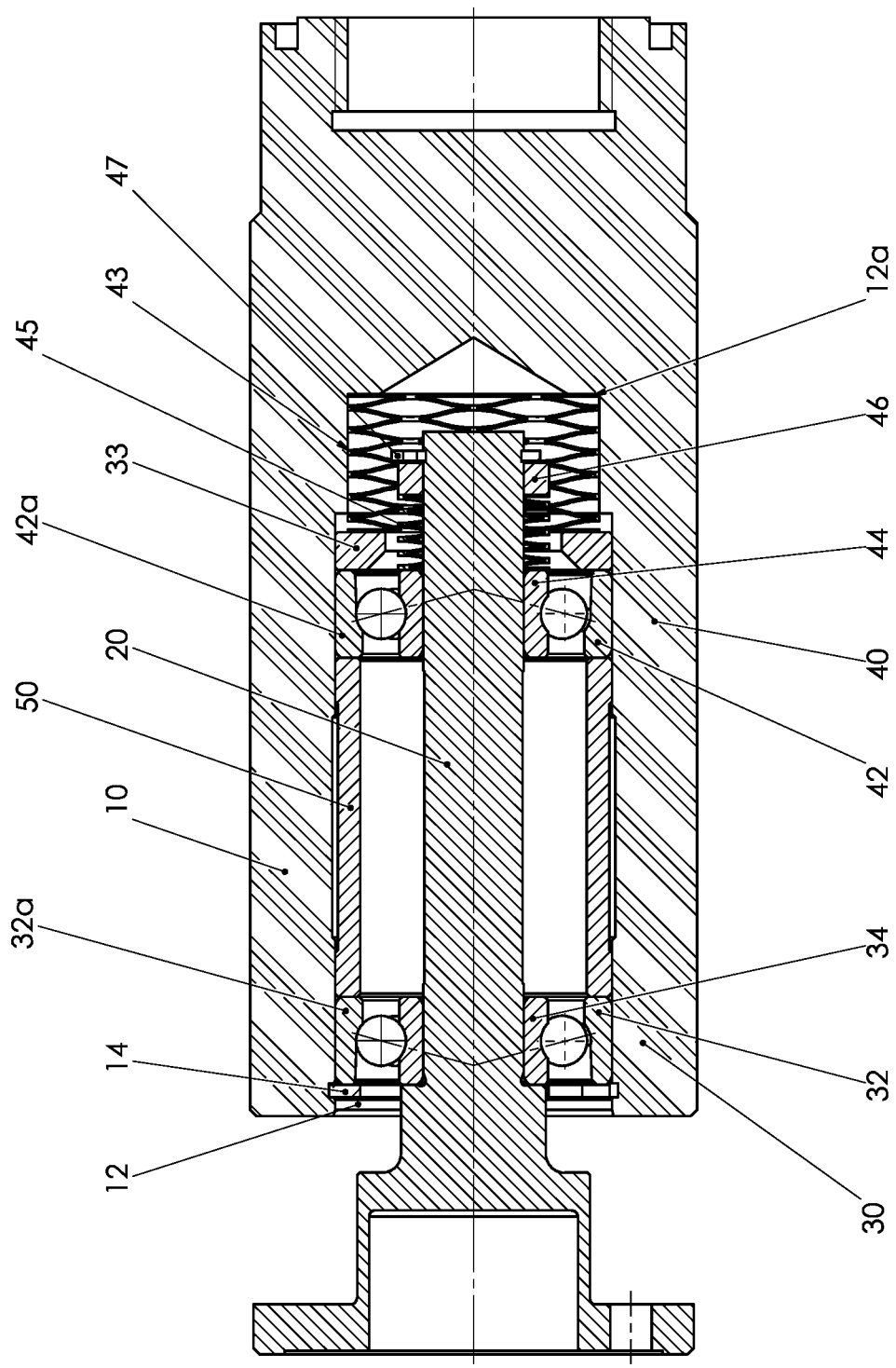
FIG. 1 shows a section through a rolling bearing assembly with two angular contact ball bearings in O-arrangement.

As shown in FIG. 1, a pair of angular contact ball bearings 30, 40 rotatably support a shaft 20 in a cylindrical receptacle 12 of a housing 10. Thus, the shaft 20 can rotate with respect to the housing 10 and is also fixed in the axial direction by the O-arrangement of the angular contact ball bearings.

The first ball bearing 30 is designed as a fixed bearing by an inner ring 34 of the first ball bearing 30 being fixed on the shaft 20 by a press fit. In other words, an outer diameter of the shaft 20 is slightly larger than an inner diameter of the inner ring 34. In addition, an outer ring 32 of the first ball bearing 30 is stationarily mounted in the cylindrical receptacle of the housing 10 in a manner fixed against rotational movement by the outer ring 32 being axially clamped between a first locking ring 14 and a sleeve 50 and/or fixed in the cylindrical receptacle 12 of the housing 10 by a press fit.

To mount the inner ring 34 of the first ball bearing 30, the inner ring 34 is heated and/or the shaft 20 is cooled to increase or decrease the dimension or the diameter by the thermal expansion so that the inner ring 34 of the first ball bearing 30 can be mounted. Alternatively or additionally, the inner ring 34 can be mounted by applying a corresponding high indentation force. The same applies to the case that the outer ring 32 has a press fit in the receptacle 12 of the housing 10.

In the present embodiment, however, the outer ring 32 of the first ball bearing 30 has a clearance fit in the receptacle of the housing 10 and is axially clamped between the first locking ring 14 and the sleeve 50, so that the outer ring 32 is disposed at an axially predefined position and is fixed against rotational movement by the clamping force. The clamping force is applied to the sleeve 50 by a first coil spring 43 via an outer ring 42 of the second ball bearing 40 in the direction toward the first locking ring 14, as described below.

In this way, the first ball bearing 30 is designed as a fixed bearing and can neither twist nor move in the axial direction.

Figure 2:
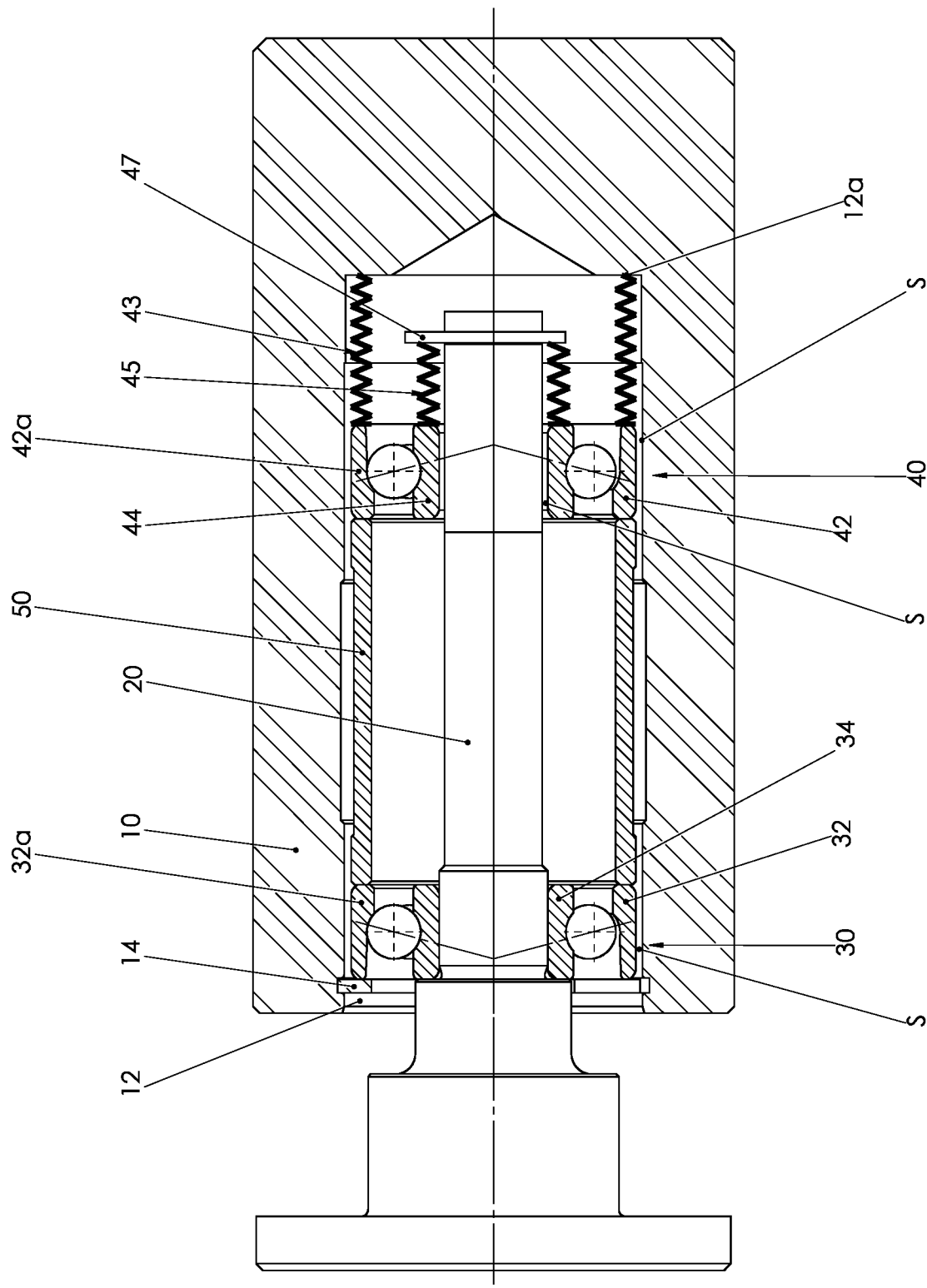
FIG. 2 shows the same section as FIG. 1, but FIG. 2 is a schematic drawing for explaining the active principle.

In contrast, the second ball bearing 40 is designed as a floating bearing by both the inner ring 44 and the outer ring 42 of the second ball bearing 40 being inserted with clearance or with a clearance fit, as shown in particular in the schematic illustration of FIG. 2.

In this case, a clearance S between the outer ring 42 and the cylindrical receptacle 12 is present in each case, and further a clearance S (FIG. 2) between the outer diameter of the shaft 20 and the inner ring 44 of the second ball bearing 40 is present. In this way, the second ball bearing 40 can move or displace axially within the receptacle 12 as well as on the shaft 20. Due to the axial displaceability of the second ball bearing, thermal expansions can be absorbed in a preferred manner.

A disadvantage of this floating bearing design, however, is that the outer ring 42 might twist with respect to the housing 10 and the inner ring 44 relative to the shaft 20 and thus the clearance fit would wear out. This must be prevented at all costs.

Thus, a compressive force is axially applied to the outer ring via the first coil spring 43 and to the inner ring 44 via a second coil spring 45. The first coil spring 43 is supported inside the housing 10, while the second coil spring 45 is supported on a second locking ring 47 attached to one end of the shaft 20. The applied elastic spring force generates a frictional force and is chosen such that it is ensured that the outer ring 42 does not twist with respect to the housing 10 and the inner ring 44 does not twist with respect to the shaft 20.

Furthermore, the outer ring 42 requires an axial abutment in order to counteract the force of the first spring 43. For this purpose, the sleeve 50 is inserted into the cylindrical receptacle 12 in a space between the first ball bearing 30 and the second ball bearing 40 such that the outer ring 42 of the second ball bearing 40 is supported on the outer ring 32 of the first ball bearing 30. This results in a clamping of the outer rings 32, 42 within the cylindrical receptacle 12 for rotationally holding or fixing the outer rings 32, 42 via the spring force of the first coil spring 43. However, axial movement of the outer ring 42 is still possible, while the outer ring 32 of the fixed bearing is fixed by the first locking ring 14 in the axial direction.

The inner ring 44, however, has no axial support via a sleeve, like the outer ring 42, because the inner ring 44 can be supported on the outer ring 42 via the balls 41 in the second ball bearing 40. The second coil spring 45 has a lower spring force than the first coil spring 43, because too high a spring force of the second coil spring 45 would lead to excessive surface pressure between the balls 41 and the bearing shells of the inner and outer rings 42, 44 of the second ball bearing 40.

Preferably, the first coil spring 43 has a spring constant in the range of about 1.5 times to about four times the spring constant of the second coil spring 45, more preferably, the range is about two to about three.

Although not shown in the schematic sketch of FIG. 2, preferably a washer 33 is disposed between the first coil spring 43 and the outer ring 42 of the second ball bearing 40 to exert a flat and uniform compressive force on the outer ring 42. Furthermore, a positioning ring 46 is preferably arranged between the second coil spring 45 and the second locking ring 47 in order to likewise exert a uniform pressure on the inner ring 44 of the second ball bearing 40.

In the embodiment shown, the angular contact ball bearings 30, 40 are arranged in the O-arrangement, in which the outer ring 32 of the first ball bearing 30 has a shoulder 32a on the side facing the second ball bearing 40, but no shoulder on the opposite side. Furthermore, the second ball bearing 40 and its outer ring 42 has a shoulder 42a on the side facing the first ball bearing 30, whereas on the opposite side of the outer ring 42, the shoulder is again missing.

However, the invention is not limited to this 0-arrangement, but can also be applied to an X-arrangement of the angular contact ball bearings 30, 40. In this case, the shoulder 32a and 42a is respectively disposed on the side opposite the other ball bearing, i.e. on the side on which no shoulder is arranged in the embodiment. Instead, in the X-arrangement, the shoulder on the side facing the other bearing is missing.

Since the principle of preloaded bearings in O-arrangement and X-arrangement is well known to the skilled person, it will not be discussed any further here.

Although the embodiment includes the angular contact ball bearings 30, 40 as rolling bearings, other rolling bearings can be used as well, in particular rolling bearings that can be preloaded, such as taper roller bearings.

The invention is not limited to the use of coil springs 43, 45 for axially loading the inner ring 44 and the outer rings 32, 42, but a plate spring or any other elastic element, such as a rubber block or the like, can be used for applying the elastic axial force.

Although in the embodiment both the outer rings 32, 42 and the inner ring 44 of the second ball bearing are fixed against rotational movement with the coil spring 43, 45, the first coil spring 43 for securing the outer rings 32, 42 may also be replaced by a feather key according to DIN 6885 or a wedge or serrations or splines in order to prevent rotational movement of the outer rings 32, 42 and at the same time allow an axial displacement of the outer ring 42.

Preferably, the cylindrical receptacle 12 has a continuous diameter and the outer diameter of the outer ring 42 of the second ball bearing 40 is substantially equal to that of the outer ring 32 of the first ball bearing 30, so that both outer rings 32, 42 can be inserted into the cylindrical receptacle 12 with the clearance S. Alternatively or additionally, the outer ring 32 of the first ball bearing 30 can be inserted into the receptacle 12 with a press fit. Further preferably, the cylindrical receptacle 12 is formed as a blind hole, so that a corresponding abutment 12a for the first coil spring 43 is provided at the end of the blind hole. However, the axial abutment 12a of the first coil spring 43 can also be provided by a washer, a screw, nut or the like.

The invention claimed is:

1. A rolling bearing assembly comprising:
   a housing,
   a shaft,
   a first rolling bearing and a second rolling bearing for rotatably supporting the shaft in the housing, wherein:
      the first rolling bearing is designed as a fixed bearing by an outer ring of the first rolling bearing being stationarily arranged in the housing and an inner ring of the first rolling bearing being fixedly connected to the shaft,
      the second rolling bearing is designed as a floating bearing by the outer ring of the second rolling bearing being arranged axially displaceable in the housing and the inner ring of the second rolling bearing being axially displaceably connected to the shaft, and
      both the outer ring and the inner ring of the second rolling bearing are each pushed toward the first rolling bearing by a respective biasing means in the axial direction to prevent rotational movement of the outer ring of the second rolling bearing with respect to the housing and rotational movement of the inner ring of the second rolling bearing with respect to the shaft.

2. The rolling bearing assembly according to claim 1, wherein the first and second rolling bearings are designed as angular contact ball bearings in O-arrangement or X-arrangement.

3. The rolling bearing assembly according to claim 1, wherein a sleeve is configured to regulate the axial distance between the outer rings of the first and second rolling bearings and/or push the outer ring of the first rolling bearing against a first locking ring arranged in the housing by the biasing means such that the outer ring of the first rolling bearing is fixed against rotation in the housing.

4. The rolling bearing assembly according to claim 1, wherein the biasing means of the outer ring of the second rolling bearing is a first coil spring and the biasing means of the inner ring of the second rolling bearing is a second coil spring arranged coaxially to the first coil spring and within the first coil spring.

5. The rolling bearing assembly according to claim 4, wherein the first coil spring has a higher spring constant than the second coil spring.

6. The rolling bearing assembly according to claim 5, wherein the ratio of the spring constant of the first coil spring to the spring constant of the second coil spring is in the range of about 1.5 to about 4.

7. The rolling bearing assembly according to claim 5, wherein the ratio of the spring constant of the first coil spring to the spring constant of the second coil spring is in the range of about 2 to about 3.

8. The rolling bearing assembly according to claim 4, wherein the first coil spring is supported in the housing and/or the second coil spring is supported on the shaft via a positioning ring and/or a locking ring.

9. The rolling bearing assembly according to claim 1, wherein the outer ring of the first rolling bearing is fixed against rotation via a clamping between a first locking ring and a sleeve and/or via a press fit in the housing, and the inner ring of the first rolling bearing forming the first fixed bearing is fixed against rotation on the shaft via a press fit and/or the floating bearing is axially displaceable and not fixed against rotation in the housing and the shaft via a sliding fit.

10. An X-ray tube bearing with a rolling bearing assembly according to claim 1, wherein no lubricants are used for the lubrication of the rolling bearing assembly and/or the rolling bearing assembly is operated in vacuum.

11. The rolling bearing assembly according to claim 1, wherein the first and second rolling bearings are designed as preloaded bearings.

12. A rolling bearing assembly comprising:
a housing,
a shaft,
a first rolling bearing and a second rolling bearing for rotatably supporting the shaft in the housing, wherein:
the first rolling bearing is designed as a fixed bearing by an outer ring of the first rolling bearing being stationarily arranged in the housing and an inner ring of the first rolling bearing being fixedly connected to the shaft,
the second rolling bearing is designed as a floating bearing by the outer ring of the second rolling bearing being arranged axially displaceable in the housing and the inner ring of the second rolling bearing being axially displaceably connected to the shaft,
the outer ring of the second rolling bearing is connected to the housing in a manner fixed against rotation, and
the inner ring of the second rolling bearing is connected to the shaft in a manner fixed against rotation and is biased toward the first rolling bearing.

13. An X-ray tube bearing with a rolling bearing assembly according to claim 12, wherein no lubricants are used for the lubrication of the rolling bearing assembly and/or the rolling bearing assembly is operated in vacuum.

14. The rolling bearing assembly according to claim 12, wherein the first and second rolling bearings are designed as in O-arrangement or X-arrangement.

* * * * *